(12) United States Patent
Murakami et al.

(10) Patent No.: US 10,688,673 B2
(45) Date of Patent: Jun. 23, 2020

(54) OSCILLATORY LINEAR ACTUATOR, HAIR CUTTING DEVICE, AND METHOD OF MANUFACTURING OSCILLATORY LINEAR ACTUATOR

(71) Applicant: Panasonic Intellectual Property Management Co., Ltd., Osaka (JP)

(72) Inventors: Tomoaki Murakami, Osaka (JP); Noboru Kobayashi, Osaka (JP); Hiroki Inoue, Shiga (JP); Masashi Moriguchi, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 161 days.

(21) Appl. No.: 15/947,919

(22) Filed: Apr. 9, 2018

(65) Prior Publication Data

US 2018/0304480 A1 Oct. 25, 2018

(30) Foreign Application Priority Data

Apr. 19, 2017 (JP) .................................. 2017-082964

(51) Int. Cl.
*H02K 33/06* (2006.01)
*H02K 33/16* (2006.01)
(Continued)

(52) U.S. Cl.
CPC .......... *B26B 19/282* (2013.01); *B26B 19/288* (2013.01); *H02K 33/06* (2013.01); *H02K 33/16* (2013.01); *H02K 7/104* (2013.01)

(58) Field of Classification Search
CPC .................... H02K 33/06; H02K 33/00–33/18
(Continued)

(56) References Cited

U.S. PATENT DOCUMENTS

2005/0134123 A1 6/2005 Kobayashi et al.
2005/0140219 A1 6/2005 Sanematsu et al.
(Continued)

FOREIGN PATENT DOCUMENTS

JP 2005-185067 A 7/2005
JP 2005-198362 A 7/2005
(Continued)

OTHER PUBLICATIONS

Extended European Search Report issued in Application No. 18165931.9 dated Sep. 6, 2018.
(Continued)

*Primary Examiner* — Thomas Truong
(74) *Attorney, Agent, or Firm* — McDermott Will & Emery LLP

(57) ABSTRACT

An oscillatory linear actuator includes an electromagnetic core block including an electromagnet (electromagnetic part), and a magnetic block that holds permanent magnets so that the permanent magnets face the electromagnet with a predetermined space in between. The electromagnetic core block integrally includes a core, a coil bobbin, and a base, the core and the coil bobbin forming the electromagnet, and the base holding the core and the coil bobbin. The magnetic block includes the permanent magnets and a frame that holds the permanent magnets so as to allow the permanent magnets to oscillate freely and holds the electromagnetic core block. The frame has a guide portion that guides the electromagnetic core block to adjust a positional relation of the permanent magnets and the electromagnet, and the base is fixed to the frame inside the guide portion.

5 Claims, 10 Drawing Sheets

(51) Int. Cl.
*B26B 19/28* (2006.01)
*H02K 7/104* (2006.01)

(58) Field of Classification Search
USPC ...................................... 310/15–39
See application file for complete search history.

(56) References Cited

U.S. PATENT DOCUMENTS

2009/0267422 A1* 10/2009 Komori .................. H02K 33/16
 310/15
2011/0254993 A1    10/2011 Maekawa et al.
2012/0074796 A1*  3/2012 Kobayashi ............. H02K 33/16
 310/25

FOREIGN PATENT DOCUMENTS

JP   2005-354879 A   12/2005
JP   2009-268251 A   11/2009

OTHER PUBLICATIONS

Japanese Office Action issued in corresponding Japanese Patent Application No. 2017-082964, dated Mar. 3, 2020.

* cited by examiner

OSCILLATORY LINEAR ACTUATOR, HAIR CUTTING DEVICE, AND METHOD OF MANUFACTURING OSCILLATORY LINEAR ACTUATOR

CROSS REFERENCE TO RELATED APPLICATION

This application claims the benefit of priority of Japanese Patent Application Number 2017-082964 filed on Apr. 19, 2017, the entire content of which is hereby incorporated by reference.

BACKGROUND

1. Technical Field

The present disclosure relates to an oscillatory linear actuator, a hair cutting device, and a method of manufacturing an oscillatory linear actuator.

2. Description of the Related Art

Conventional electric devices such as electric hair clippers and electric shavers include an oscillatory linear actuator for oscillating a movable blade (see, for example, Japanese Unexamined Patent Application Publication No. 2009-268251). The oscillatory linear actuator includes a stator and a mover, the stator being an electromagnet provided with a core, a coil bobbin, and a winding, and the mover being movable relative to the stator. The core has a plurality of protrusions that protrude outward, and these protrusions are fitted into supports that are integrated with the mover so as to position the core and a permanent magnet held by the mover.

SUMMARY

Even though the protrusions of the core are fitted into the supports, the positioning of the permanent magnet and the core varies because in reality there are variations in the dimensions of components due to individual differences in the components. Variations in the positional relation of the permanent magnet and the core cause variations in the performance of each individual oscillatory linear actuator.

In view of this, it is an object of the present disclosure to, even if there are individual differences in components, increase the accuracy of positioning of the permanent magnet and the core and reduce variations in the performance of each individual oscillatory linear actuator.

In order to achieve the above-described object, an oscillatory linear actuator according to an aspect of the present disclosure includes an electromagnetic core block including an electromagnet, and a magnetic block that holds a permanent magnet so that the permanent magnet faces the electromagnet with a predetermined space in between. The electromagnetic core block integrally includes a core and a coil bobbin that form the electromagnet, and a base that holds the core and the coil bobbin. The magnetic block includes the permanent magnet, and a frame that holds the permanent magnet to allow the permanent magnet to oscillate freely and holds the electromagnetic core block. The frame has a guide portion that guides the electromagnetic core block to adjust a positional relation of the permanent magnet and the electromagnet. The base is fixed to the frame inside the guide portion.

A hair cutting device according to an aspect of the present disclosure includes the oscillatory linear actuator described above and a movable blade connected to the oscillatory linear actuator.

A method of manufacturing an oscillatory linear actuator according to an aspect of the present disclosure is a method of manufacturing the oscillatory linear actuator described above, and includes assembling the electromagnetic core block by mounting the core and the coil bobbin on the base, adjusting the positional relation of the permanent magnet and the electromagnet by guiding the electromagnetic core block by the guide portion of the frame, and fixing the base to the frame inside the guide portion.

According to the present disclosure, even if there are individual differences in components, it is possible to increase the accuracy of positioning of the permanent magnet and the core and reduce variations in the performance of each individual oscillatory linear actuator.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
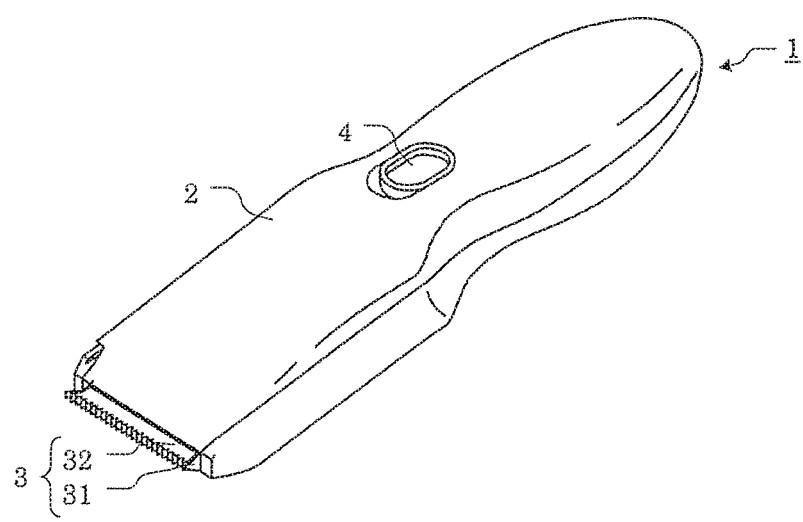
FIG. 1 is a perspective view illustrating a schematic configuration of a hair cutting device according to an embodiment.

A hair cutting device and an oscillatory linear actuator according to embodiments of the present disclosure will be described in detail hereinafter with reference to the drawings. Each embodiment described below shows a specific example of the present disclosure. Thus, numerical values, shapes, materials, constituent elements, arrangement and connection forms of constituent elements, and so on given in the following embodiments are merely examples and are not intended to limit the present disclosure. Among the constituent elements in the following embodiments, those that not recited in any one of the independent claims, which represent the broadest concept of the present disclosure, are described as optional constituent elements.

Note that the drawings are schematic diagrams and do not always strictly follow the actual configuration. In the drawings, constituent members that are substantially identical are given the same reference numerals.

Hair Cutting Device

A hair cutting device according to an embodiment will now be described. FIG. 1 is a perspective view illustrating a schematic configuration of hair cutting device 1 according to an embodiment. Hair cutting device 1 is, for example, an electric hair clipper that includes case 2, blade unit 3, and switch 4. Oscillatory linear actuator 100 for driving blade unit 3 (see, for example, FIG. 2) is housed in case 2.

Blade unit 3 is mounted on a tip portion of case 2. Blade unit 3 has a function of cutting hair. Specifically, blade unit 3 includes stationary blade 31 and movable blade 32. Stationary blade 31 is fixed to the tip portion of case 2. Movable blade 32 is connected to output shaft 600 (see, for example, FIG. 2) of oscillatory linear actuator 100. Stationary blade 31 and movable blade 32 are in contact with each other at their facing surfaces. Movable blade 32 is reciprocated relative to stationary blade 31 by oscillatory linear actuator 100. This reciprocating motion allows blade unit 3 to cut hair.

Oscillatory Linear Actuator

Next, oscillatory linear actuator 100 will be described in detail.

Figure 2:
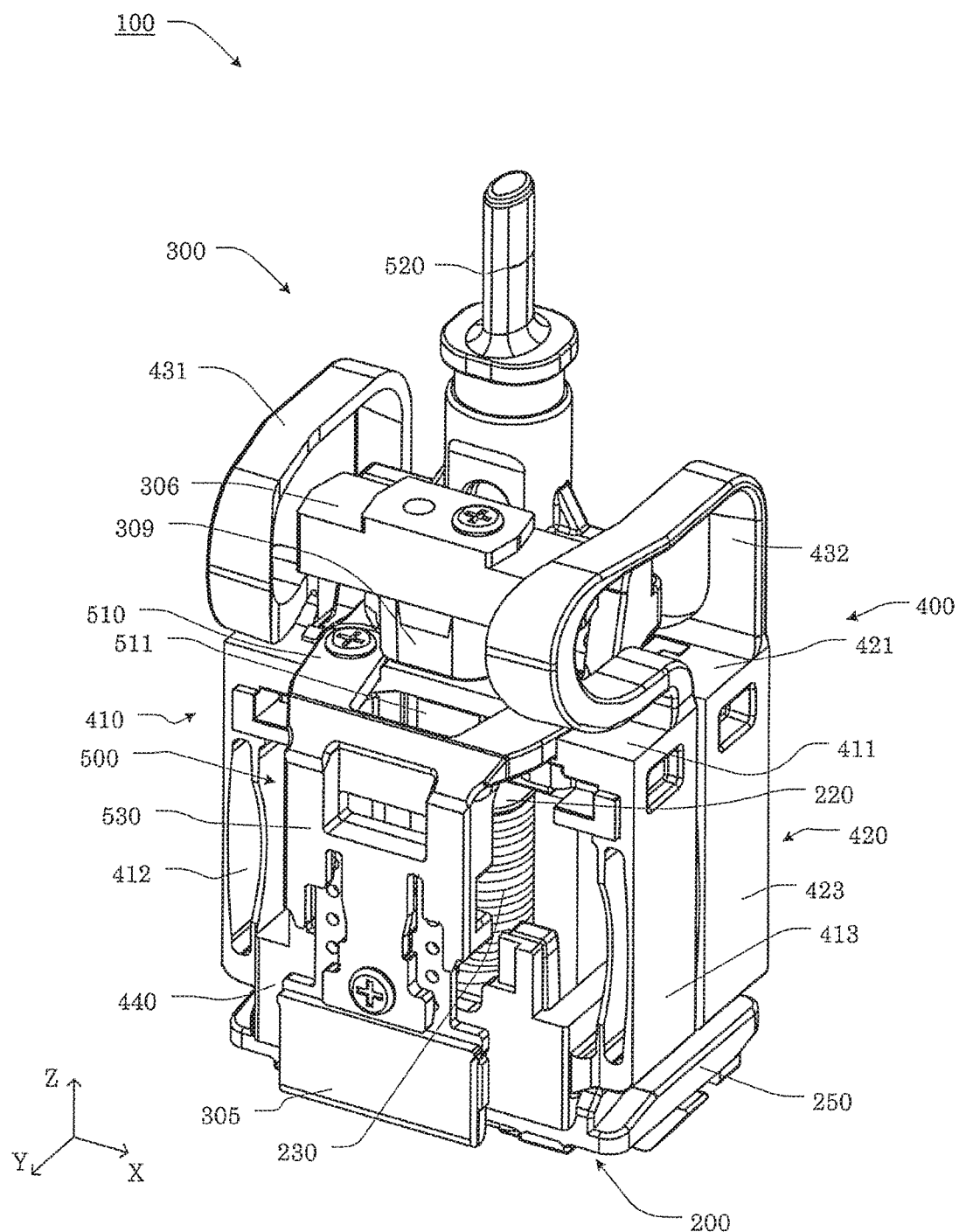
FIG. 2 is a perspective view illustrating a schematic configuration of an oscillatory linear actuator according to an embodiment.
Figure 3:
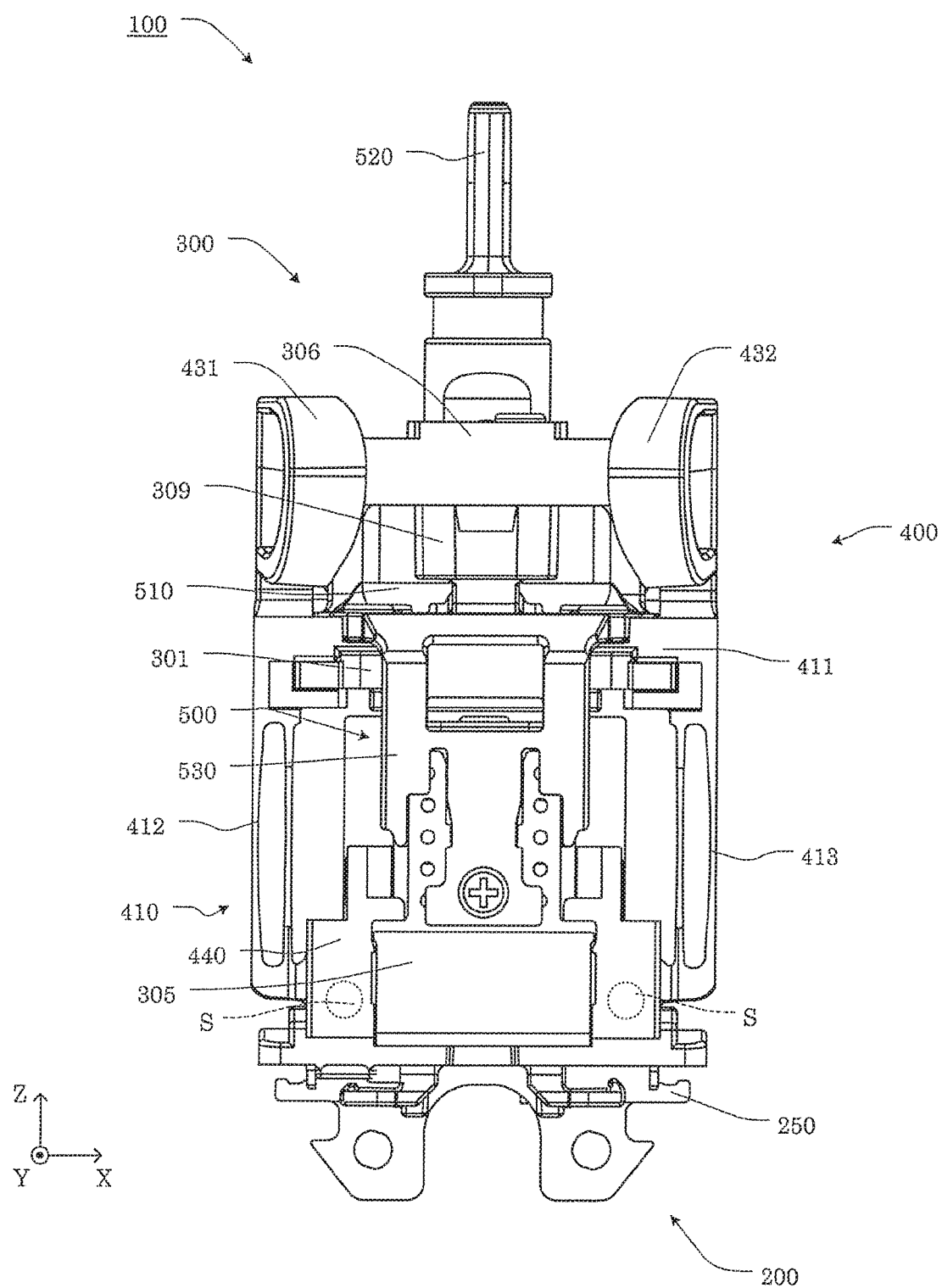
FIG. 3 is a front view illustrating a schematic configuration of the oscillatory linear actuator according to the embodiment.
Figure 4:
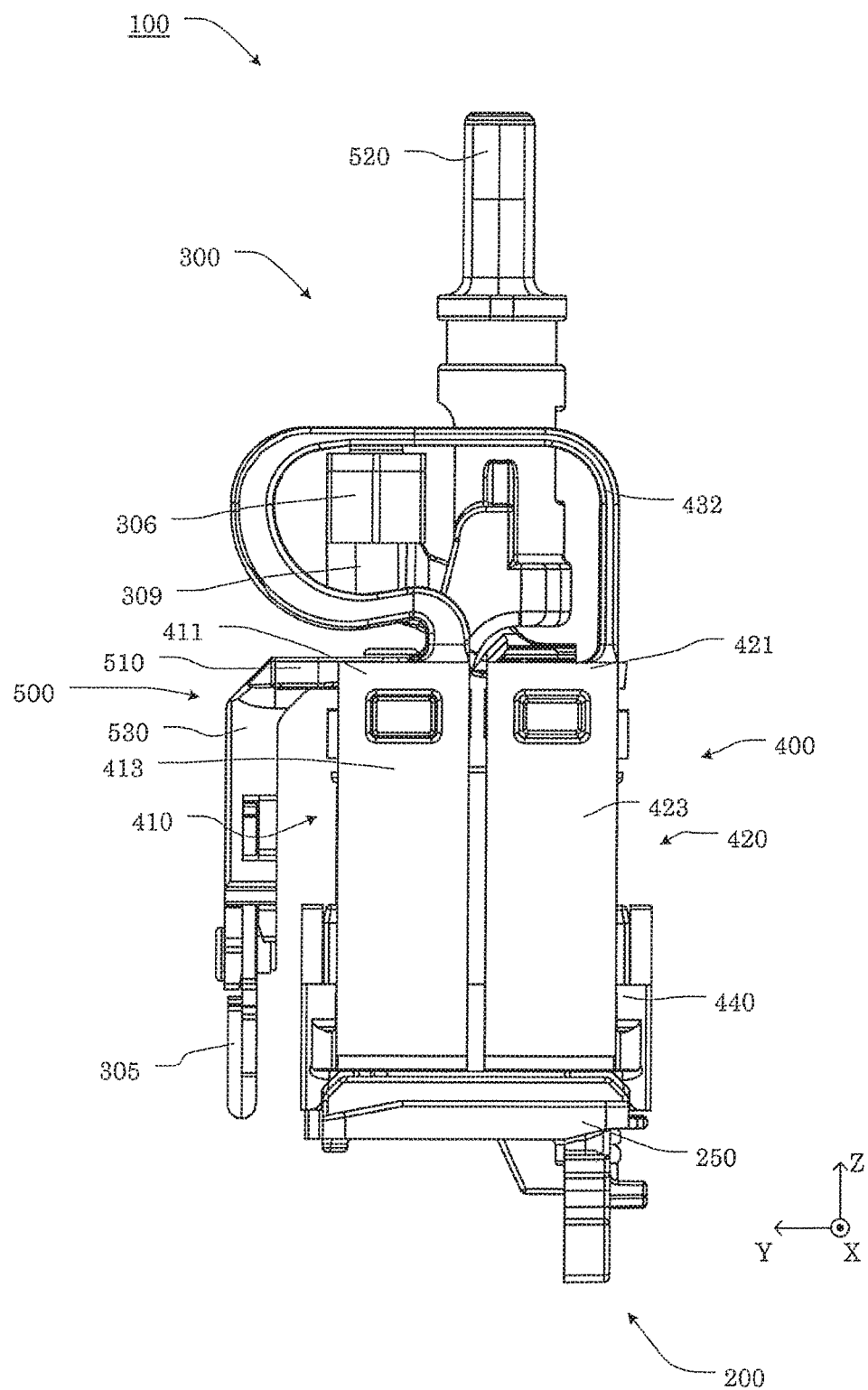
FIG. 4 is a side view illustrating a schematic configuration of the oscillatory linear actuator according to the embodiment.
Figure 5:
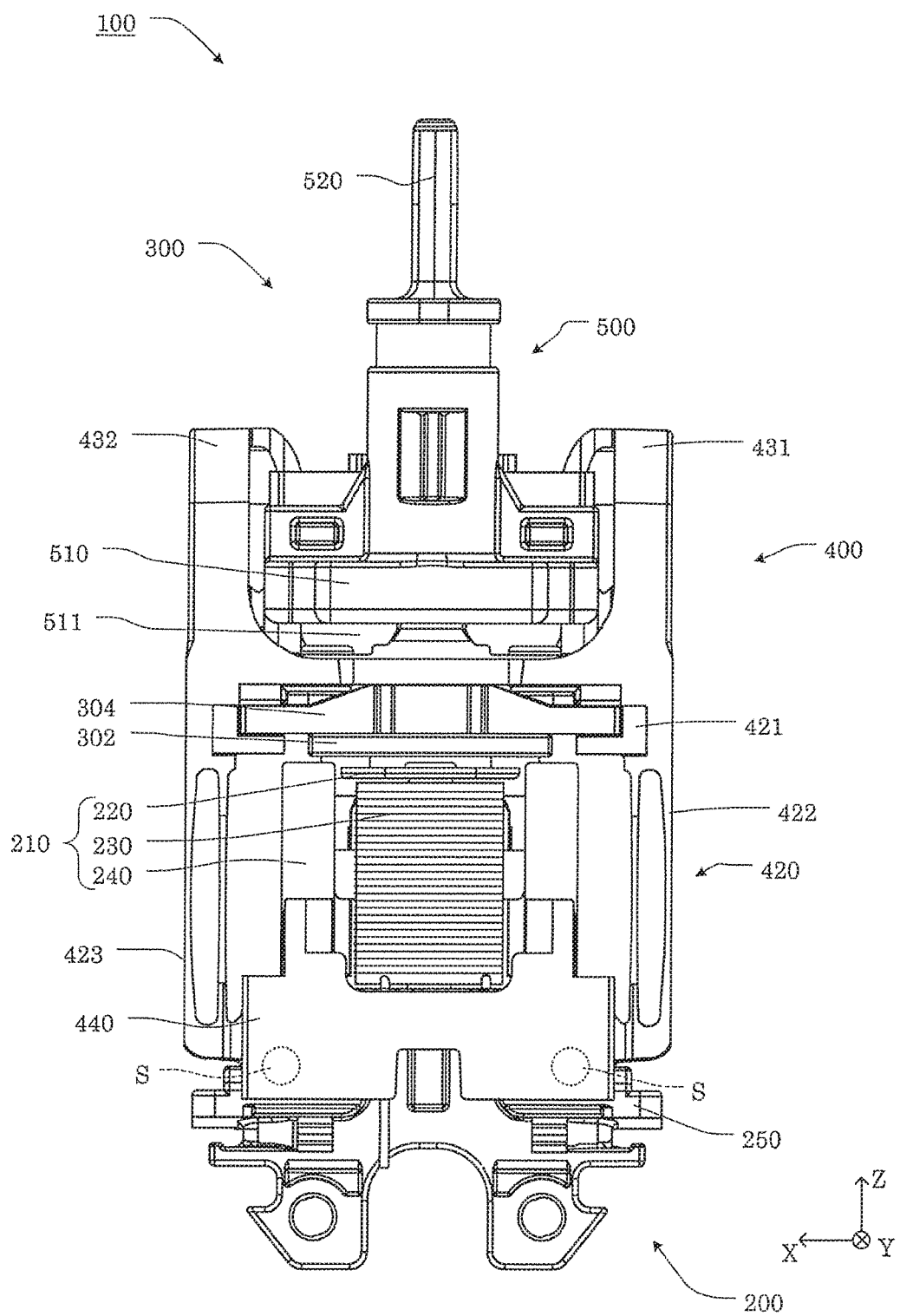
FIG. 5 is a rear view illustrating a schematic configuration of the oscillatory linear actuator according to the embodiment.
Figure 6:
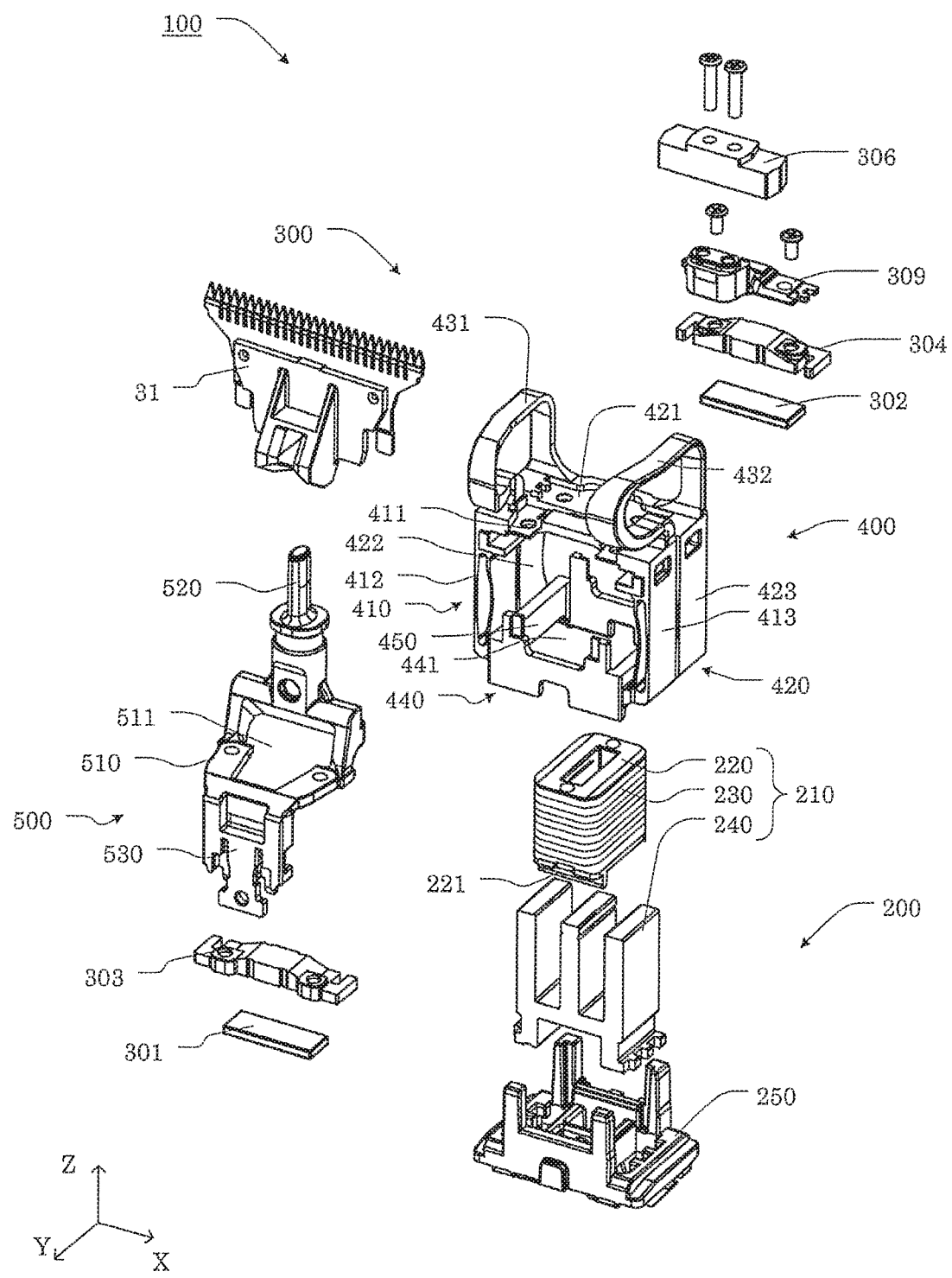
FIG. 6 is an exploded perspective view illustrating a schematic configuration of the oscillatory linear actuator according to the embodiment.

FIG. 2 is a perspective view illustrating a schematic configuration of the oscillatory linear actuator according to the embodiment. FIG. 3 is a front view illustrating a schematic configuration of the oscillatory linear actuator according to the embodiment. FIG. 4 is a side view illustrating a schematic configuration of the oscillatory linear actuator according to the embodiment. FIG. 5 is a rear view illustrating a schematic configuration of the oscillatory linear actuator according to the embodiment. FIG. 6 is an exploded perspective view illustrating a schematic configuration of the oscillatory linear actuator according to the embodiment.

FIGS. 2 to 6 illustrate each component in a three-dimensional orthogonal coordinate system in which the direction of oscillation of movable blade 32 is taken as the X axial direction, the direction of alignment of movable blade 32 and stationary blade 31 is taken as the Y axial direction, and the axial direction of output shaft 500 is taken as the Z axial direction. Depending on the conditions of use, there can be cases in which the Z axial direction is not the up-down direction, but for the sake of convenience of description, the Z axial direction is described as the up-down direction in the following description.

Oscillatory linear actuator 100 illustrated in FIGS. 2 to 6 includes electromagnetic core block 200 and magnetic block 300.

Electromagnetic Core Block

Electromagnetic core block 200 includes electromagnetic part 210 that forms an electromagnet, and base 250 that holds electromagnetic part 210.

Electromagnetic part 210 includes coil bobbin 220, coil 230, and core 240.

As illustrated in FIG. 6, coil bobbin 220 is made of an insulator and has a prism shape. Coil bobbin 220 has conductive coil 230 wound therearound. Coil bobbin 220 has limiting protrusion 221 at the lower end, the limiting protrusion limiting the movement of core 240 and base 250 relative to each other. Specifically, limiting protrusion 221 is formed along one edge at the lower end of coil bobbin 220. The positional relation of limiting protrusion 221 and each component during limitations will be described later.

Figure 7:
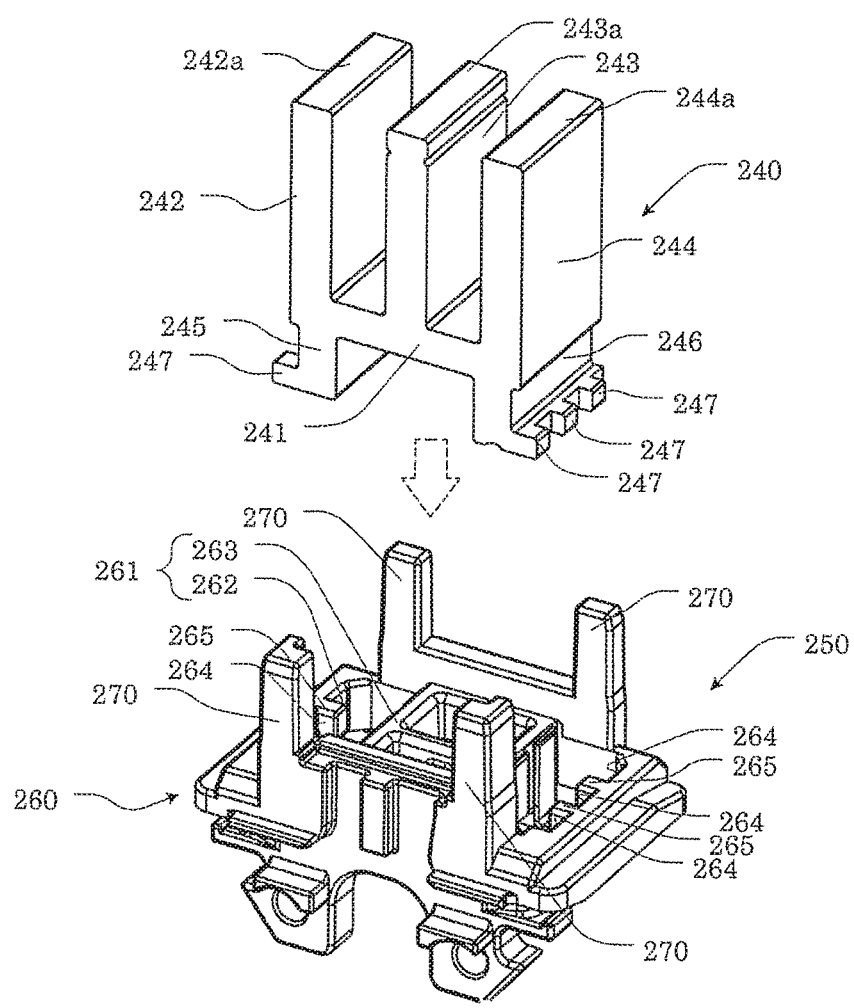
FIG. 7 is an exploded perspective view of a core and a base before assembly according to the embodiment.
Figure 7:
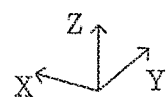
Figure 8:
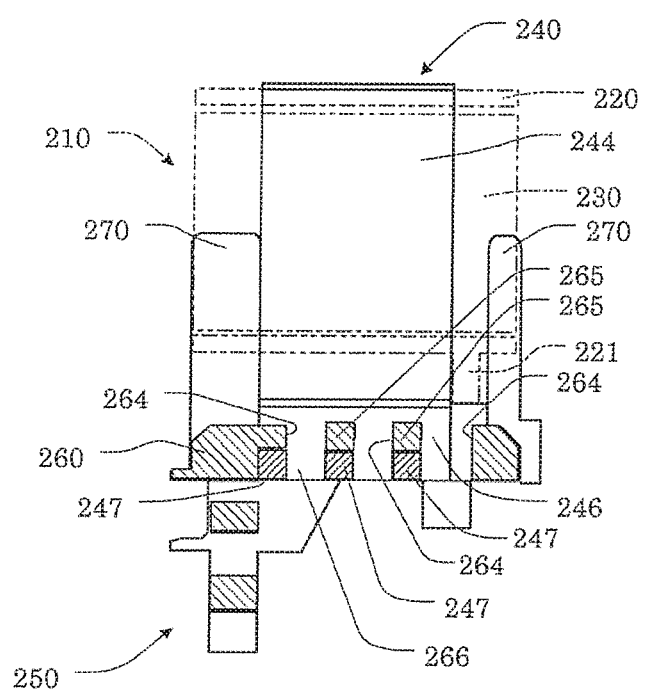
FIG. 8 is a partial cross-sectional view of the core and the base after assembly according to the embodiment.
Figure 8:
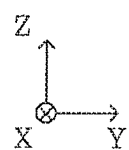

FIG. 7 is an exploded perspective view of core 240 and base 250 before assembly according to the embodiment. FIG. 8 is a partial cross-sectional view of core 240 and base 250 after assembly according to the embodiment. In FIG. 8, the outside shapes of coil bobbin 220 and coil 230 of electromagnetic part 210 are indicated by dashed double-dotted lines.

As illustrated in FIGS. 7 and 8, core 240 includes base portion 241, three columnar portions 242, 243, and 244, and two leg portions 245 and 246, and these portions are integrally made of a magnetic substance.

Base portion 241 has a flat plate-like shape, and three columnar portions 242, 243, and 244 are provided at a predetermined interval on the upper surface of base portion 241. Meanwhile, two leg portions 245 and 246 are provided at a predetermined interval on the lower surface of base portion 241. Among three columnar portions 242, 243, and 244, columnar portions 242 and 244 on both ends face two leg portions 245 and 246 in the up-down direction (Z axial direction). Columnar portion 243 in the center has coil bobbin 220 attached thereto. If an alternating current is supplied to coil 230 in this state, a magnetic force is generated at columnar portions 242, 243, and 244 of core 240. With the supply of the alternating current to coil 230, the north and south poles interchange periodically at end surfaces 242a, 243a, and 244a of columnar portions 242, 243, and 244.

Each of two leg portions 245 and 246 has a plurality of first lugs 247 on the outer side surface, the first lugs protruding outward so as to intersect with the Z axial direction. Specifically, a plurality of first lugs 247 are disposed at a predetermined interval in the Y axial direction and protrude in the X axial direction.

Base 250 is made of, for example, an insulator and integrally includes pedestal 260 that supports core 240, and four guide columns 270 that stand on pedestal 260.

Pedestal 260 has locking portion 261 that locks two leg portions 245 and 246 of core 240. Specifically, locking portion 261 includes through portion 262 that receives two leg portions 245 and 246, and support 263 that supports base portion 241 of core 240 from the underside. Through portion 262 has a plurality of slits 264 therein, each slit serving as a path in the Z axial direction for each first lug 247 of two leg portions 245 and 246. Slits 264 penetrate in the Z axial direction. Portions between each pair of slits 264 form second lugs 265. Second lugs 265 protrude inward so as to intersect with the Z axial direction. Specifically, second lugs 265 are arranged at a predetermined interval in the Y axial direction and protrude in the X axial direction.

As illustrated in FIG. 8, there is space 266 below the plurality of second lugs 265, the space serving as a horizontal path for each first lug 247. When the plurality of first lugs 247 move in the horizontal direction within space 266 during assembly, base portion 241 of core 240 also moves along the upper surface of support 263. This movement causes the plurality of first lugs 247 and the plurality of second lugs 265 to face each other, so that second lugs 265 are engaged with first lugs 247. This position at which first lugs 247 are engaged with second lugs 265 is referred to as an "engagement position." An engaging path that guides first lugs 247 to the engagement position is formed by slits 264 and space 266. That is, base 250 has the engaging path.

With second lugs 265 engaged with first lugs 247, core 240 is locked by second lugs 265 and support 263, and the movement of core 240 in the up-down direction is limited. If coil bobbin 220 is assembled on core 240 in this state, limiting protrusion 221 fits between core 240 and base 250. Specifically, limiting protrusion 221 fits in a space in the Y axial direction between base portion 241 of core 240 and pedestal 260 of base 250. As a result, limiting protrusion 221 limits the movement of core 240 so as to prevent first lugs 247 from moving from the engagement position.

Four guide columns 270 are disposed at positions corresponding to each corner of a virtual rectangle when viewed from above. Four guide columns 270 stand on pedestal 260 so as to extend in the Z axial direction. Four guide columns 270 are portions that are guided by frame 400 of magnetic block 300, which will be described later.

Magnetic Block

As illustrated in FIGS. 2 to 6, magnetic block 300 includes frame 400, output shaft 500, a pair of permanent magnets 301 and 302, a pair of back yokes 303 and 304, a pair of weights 305 and 306, and connector 309.

Frame 400 holds output shaft 500, the pair of permanent magnets 301 and 302, the pair of back yokes 303 and 304, the pair of weights 305 and 306, and connector 309, and also holds electromagnetic core block 200. Specifically, frame 400 is integrally molded of, for example, a resin and includes first and second holders 410 and 420 that oscillate with different phases, a pair of coupling springs 431 and 432 that couple first and second holders 410 and 420, and third holder 440 that holds electromagnetic core block 200.

First holder 410 holds a set of permanent magnet 301, back yoke 303, and weight 305, and output shaft 500. Specifically, first holder 410 includes long plate-like first stationary portion 411 that extends in the X axial direction, and a pair of first spring portions 412 and 413 that are suspended from both ends of first stationary portion 411 and coupled to third holder 440.

Permanent magnet 301, back yoke 303, and output shaft 500 are placed and screwed in the specified order from below onto first stationary portion 411. Specifically, back yoke 303 is screwed onto first stationary portion 411 so as to sandwich and fix long plate-like permanent magnet 301 between itself and first stationary portion 411. Permanent magnet 301 and electromagnetic part 210 face each other in the up-down direction via first stationary portion 411, with a predetermined space in between.

Output shaft 500 includes body portion 510, shaft portion 520, and weight support 530.

Body portion 510 is a portion that is coupled to first stationary portion 411 and has a crank-like shape. Body portion 510 has opening 511 in the center.

Shaft portion 520 is an approximately circular columnar portion that protrudes upward from one edge of the top of body portion 510. Since shaft portion 520 is connected to movable blade 32, movable blade 32 moves in synchronization with the oscillation of first holder 410.

Weight support 530 is a portion that is suspended from the other edge of body portion 510. Weight support 530 supports weight 305.

Second holder 420 holds another set of permanent magnet 302, back yoke 304, and weight 306. Weight 306 is connected to back yoke 304 via connector 309.

Second holder 420 includes long plate-like second stationary portion 421 that extends in the X axial direction, and a pair of second spring portions 422 and 423 that are suspended from both ends of second stationary portion 421 and coupled to third holder 440. Second holder 420 is adjacent to first holder 410 in the Y axial direction.

Permanent magnet 302, back yoke 304, connector 309, and weight 306 are placed and screwed in the specified order from below onto second stationary portion 421. Specifically, back yoke 304 is screwed onto second stationary portion 421 so as to sandwich and fix long plate-like permanent magnet 302 between itself and second stationary portion 421. Permanent magnet 302 and electromagnetic part 210 face each other in the up-down direction via second stationary portion 421, with a predetermined space in between. Note that permanent magnets 301 and 302 are disposed so as to be opposite in polarity. For example, permanent magnets 301 and 302 are disposed such that when the negative end portion in the X axial direction of permanent magnet 301 is the north pole and the positive end portion thereof is the south pole, the negative end portion in the X axial direction of permanent magnet 302 is the south pole and the positive end portion thereof is the north pole.

Connector 309 is screwed onto back yoke 304. Connector 309 is configured capable of passing opening 511 of output shaft 500, and weight 306 is screwed onto the tip portion of connector 309. Thus, weight 306 is disposed at a position facing first stationary portion 411 of first holder 410.

The pair of coupling springs 431 and 432 is a pair of flat and curved plate springs and couples first and second holders 410 and 420 so as to allow first and second holders 410 and 420 to oscillate freely. Specifically, one coupling spring 431 out of the pair of coupling springs 431 and 432 couples one end of first stationary portion 411 of first holder 410 and one end of second stationary portion 421 of second holder 420. The other coupling spring 432 couples the other end of first stationary portion 411 of first holder 410 and the other end of second stationary portion 421 of second holder 420.

Third holder 440 is a frame body with a rectangular opening 441 when viewed from above. This portion of third holder 440 that forms opening 441 forms guide portion 450 that guides electromagnetic core block 200. Specifically, guide portion 450 is an inner wall surface that forms opening 441 and extends continuously in the Z axial direction. Each corner of rectangular opening 441 corresponds to each guide column 270 of base 250. That is, each corner of opening 441 guides each guide column 270 in the Z axial direction along the inner wall surface serving as guide portion 450. The Z axial direction corresponds to a guide direction. During assembly, the positional relation of permanent magnets 301 and 302 and electromagnetic part 210 (electromagnet) in the Z axial direction can be adjusted by guiding base 250 of electromagnetic core block 200 by guide portion 450. Then, base 250 is fixed to frame 400 inside guide portion 450.

Third holder 440 is coupled to first spring portions 412 and 413 of first holder 410 and second spring portions 422 and 423 of second holder 420. Thus, first spring portions 412 and 413 and second spring portions 422 and 423 oscillate with the points of coupling with third holder 440 as starting points.

Operations

Next, operations of oscillatory linear actuator 100 will be described.

When an alternating current is supplied to coil 230 of electromagnetic part 210 forming an electromagnet, the north and south poles interchange periodically at top end surfaces 242a, 243a, and 244a of columnar portions 242, 243, and 244.

Meanwhile, permanent magnet 301 held by first holder 410 and permanent magnet 302 held by second holder 420 are disposed so as to be opposite in polarity. Thus, opposite moving forces in the X axial direction act periodically on permanent magnets 301 and 302, with electromagnetic forces generated by electromagnetic part 210 and permanent magnets 301 and 302. As a result, first and second holders 410 and 420 oscillate with opposite phases. Since output shaft 500 held by first holder 410 also oscillates similarly, movable blade 32 also reciprocates in the X axial direction.

Manufacturing Method

Next, a method of manufacturing oscillatory linear actuator 100 will be described.

Figure 9:
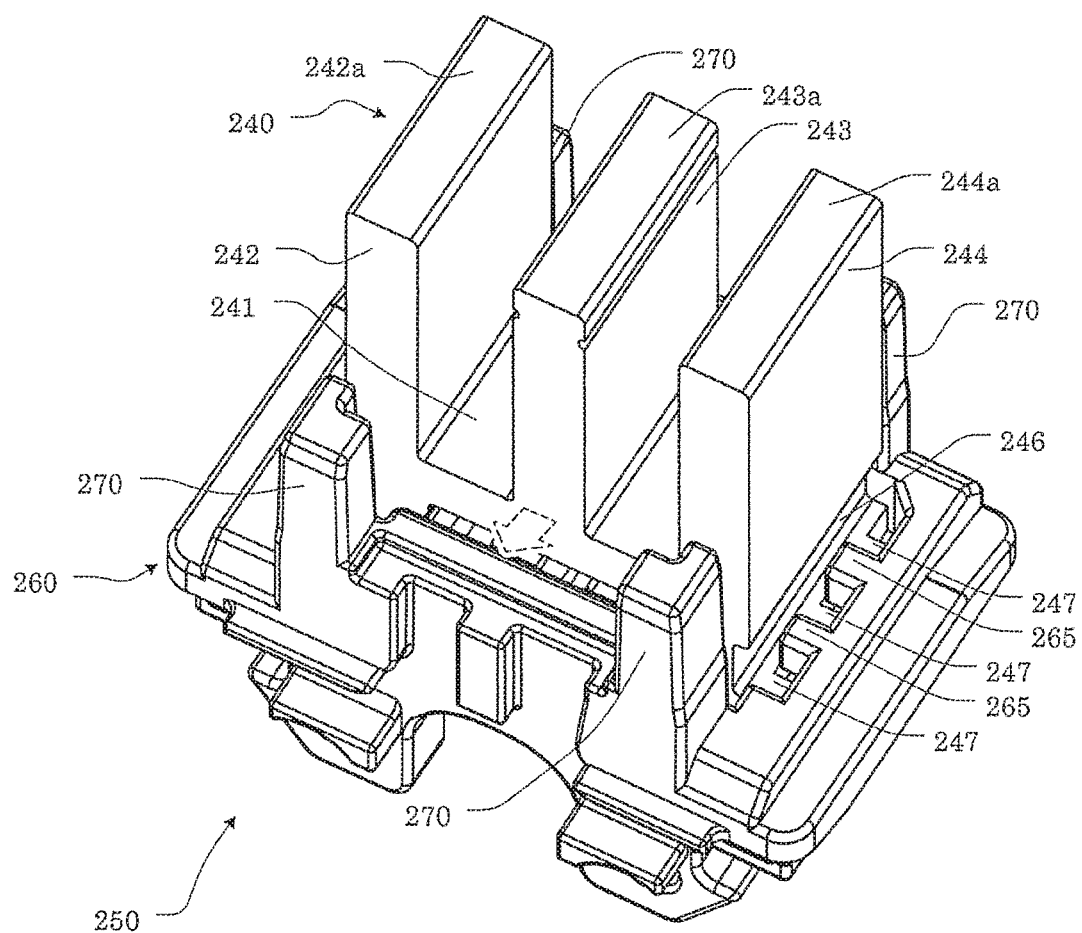
FIG. 9 is a perspective view illustrating one step in a method of assembling a magnetic block according to the embodiment.
Figure 9:
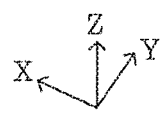
Figure 10:
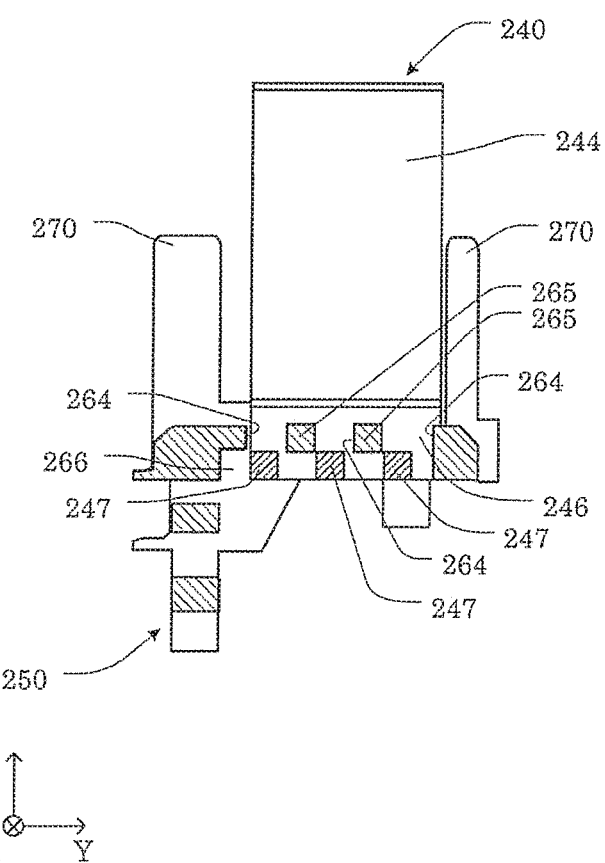
FIG. 10 is a partial cross-sectional view illustrating a state of an electromagnetic core block in the step illustrated in FIG. 9 according to the embodiment.

A procedure for assembling electromagnetic core block 200 will be described first. FIG. 9 is a perspective view illustrating one step in the method of assembling electromagnetic core block 200 according to an embodiment. FIG. 10 is a partial cross-sectional view illustrating a state of electromagnetic core block 200 in the same step as that illustrated in FIG. 9 according to the embodiment. Although a case where an operator carries out the assembly is shown as an example, the assembly may be made using assembling equipment.

First, the operator assembles core 240 on base 250. Specifically, the operator inserts leg portions 245 and 246 of core 240 into through portion 262 of base 250 in the state illustrated in FIG. 7 so that each first lug 247 of core 240 passes through each slit 264 of base 250. As a result, base 250 and core 240 appear as illustrated in FIGS. 9 and 10.

The operator then slides core 240 in the Y axial direction, so that each first lug 247 moves in space 266 and reaches the engagement position (see FIG. 8). At the engagement position, second lugs 265 are engaged with first lugs 247 and accordingly core 240 is locked by second lugs 265 and support 263. This limits the movement of core 240 in the up-down direction.

Thereafter, the operator mounts coil bobbin 220 having coil 230 wound therearound on columnar portion 243 of core 240, so that limiting protrusion 221 of coil bobbin 220 fits between core 240 and base 250. In this way, limiting protrusion 221 limits the movement of core 240 so as to prevent first lugs 247 from moving from the engagement position. The fit of limiting protrusion 221 between core 240 and base 250 integrates coil bobbin 220, coil 230, and core 240, forming electromagnetic part 210.

Next, a procedure for assembling electromagnetic core block 200 and magnetic block 300 will be described.

First, the operator assembles output shaft 500, the pair of permanent magnets 301 and 302, the pair of back yokes 303 and 304, the pair of weights 305 and 306, and connector 309 on frame 400.

Thereafter, the operator inserts electromagnetic core block 200 into opening 441 of third holder 440 of frame 400. At this time, at each corner of opening 441, each guide column 270 of electromagnetic core block 200 is guided in the Z axial direction along the inner wall surface serving as guide portion 450. That is, electromagnetic core block 200 is guided in the Z axial direction while its horizontal movement is limited by guide portion 450. The operator adjusts the positional relation of electromagnetic part 210 and the pair of permanent magnets 301 and 302 in the Z axial direction by moving electromagnetic core block 200 in the Z axial direction along guide portion 450. Thus, even if there are individual differences in components, electromagnetic part 210 and the pair of permanent magnets 301 and 302 can be positioned with accuracy in the Z axial direction.

After the positioning, the operator fixes third holder 440 and electromagnetic core block 200 in frame 400. Specifically, overlapping portions (welding positions S in FIGS. 3 and 5) of third holder 440 and base 250 of electromagnetic core block 200 are welded by, for example, laser welding.

Accordingly, base 250 is fixed to frame 400 inside guide portion 450 of frame 400. Instead of welding, other methods such as adhesive bonding or contact bonding may be adopted for bonding with guide portion 450 of frame 400.

The present embodiment describes a case in which the pair of permanent magnets 301 and 302, the pair of back yokes 303 and 304, the pair of weights 305 and 306, and connector 309 are assembled on frame 400 before assembly of frame 400 and electromagnetic core block 200. However, the assembly of the pair of permanent magnets 301 and 302, the pair of back yokes 303 and 304, the pair of weights 305 and 306, and connector 309 on frame 400 may be carried out after frame 400 and electromagnetic core block 200 are fixed to each other.

Advantageous Effects

As described above, oscillatory linear actuator 100 according to the present embodiment includes electromagnetic core block 200 that includes an electromagnet (electromagnetic part 210) and magnetic block 300 that holds permanent magnets 301 and 302 such that the permanent magnets face the electromagnet with a predetermined space in between. Electromagnetic core block 200 integrally includes core 240, coil bobbin 220, and base 250, the core and the coil bobbin forming the electromagnet, and the base holding core 240 and coil bobbin 220. Magnetic block 300 includes permanent magnets 301 and 302 and frame 400 that holds permanent magnets 301 and 302 so as to allow the permanent magnets to oscillate freely and also holds electromagnetic core block 200. Frame 400 includes guide portion 450 for guiding electromagnetic core block 200 so as to adjust the positional relation of permanent magnets 301 and 302 and the electromagnet, and base 250 is fixed to frame 400 inside guide portion 450.

Hair cutting device 1 according to the present embodiment includes oscillatory linear actuator 100 described above and movable blade 32 connected to oscillatory linear actuator 100.

In the method of manufacturing oscillatory linear actuator 100 according to the present embodiment, electromagnetic core block 200 is first assembled by mounting core 240 and coil bobbin 220 on base 250, and after the positional relation of permanent magnets 301 and 302 and the electromagnet is adjusted by guiding electromagnetic core block 200 by guide portion 450 of frame 400, base 250 is fixed to frame 400 inside guide portion 450.

With this configuration, the positional relation of permanent magnets 301 and 302 and the electromagnet in the Z axial direction can be adjusted during assembly by guiding electromagnetic core block 200 by guide portion 450 of frame 400. Thus, even if there are individual differences in components, the electromagnet and the pair of permanent magnets 301 and 302 can be positioned with accuracy. Accordingly, variations in the performance of each individual oscillatory linear actuator 100 can be reduced.

By adjusting the positional relation of the electromagnet and the pair of permanent magnets 301 and 302 in the Z axial direction, oscillation performance can also be adjusted to the desired level.

Core 240 has first lugs 247 that protrude in the direction intersecting with the guide direction (up-down direction, Z axial direction) of guide portion 450. Base 250 has second lugs 265 and the engaging path (slits 264 and space 266), the second lugs protruding in the direction intersecting with the guide direction to be engaged with first lugs 247 and limit the movement of core 240 in the guide direction, and the engaging path guiding first lugs 247 to the engagement position at which first lugs 247 engage with second lugs 265.

With this configuration, if first lugs 247 of core 240 are moved to the engagement position through the engaging path, second lugs 265 of base 250 can engage with first lugs 247 and limit the movement of core 240 in the guide direction (Z axial direction). This stabilizes the positional relation of core 240 and base 250 in the Z axial direction. Thus, the positional relation of core 240 and the pair of permanent magnets 301 and 302 in the Z axial direction can be maintained by simply fixing base 250 to frame 400.

Coil bobbin 220 has limiting protrusion 221 that fits between core 240 and base 250 and limits the movement of core 240 so as to prevent first lugs 247 from moving from the engagement position.

With this configuration, limiting protrusion 221 limits the movement of core 240 so as to prevent first lugs 247 from moving from the engagement position. That is, the movement of core 240 can be limited with the presence of limiting protrusion 221 by simply mounting coil bobbin 220 on core 240. This suppresses rattling of core 240.

The fit of limiting protrusion 221 between core 240 and base 250 also improves integration of core 240, base 250, and coil bobbin 220.

Other Embodiments

While the hair cutting device and the oscillatory linear actuator according to the present disclosure have been described thus far by way of embodiments, the present disclosure is not intended to be limited to the embodiments described above.

For example, while the above embodiments describe an electric hair clipper as an example of the hair cutting device, the hair cutting device may be any equipment that cuts hair. Examples other than electric hair clippers include electric shavers.

The present disclosure also includes other embodiments obtained by making various modifications conceivable by a person skilled in the art to each embodiment, and embodiments implemented by any combination of the constituent elements and functions of each embodiment without departing from the scope of the present disclosure.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

What is claimed is:

1. An oscillatory linear actuator comprising:
   an electromagnetic core block including an electromagnet; and
   a magnetic block that holds a permanent magnet so that the permanent magnet faces the electromagnet with a predetermined space in between,
   wherein the electromagnetic core block integrally includes:
      a core and a coil bobbin that form the electromagnet; and
      a base that holds the core and the coil bobbin,
   wherein the magnetic block includes:
      the permanent magnet; and
      a frame that holds the permanent magnet to allow the permanent magnet to oscillate freely and holds the electromagnetic core block,
   wherein the frame has a guide portion that guides the electromagnetic core block to adjust a positional relation of the permanent magnet and the electromagnet, and
   wherein the base is fixed to the frame inside the guide portion,
   wherein the core has a first lug that protrudes in a first direction intersecting with a guide direction in which the guide portion guides the electromagnetic core block, and
   wherein the base has:
      a second lug that protrudes in the first direction intersecting with the guide direction to be engaged with the first lug and limit movement of the core in the guide direction; and
      an engaging path that extends in a second direction intersecting with the guide direction and the first direction, and allows the first lug to move in the second direction to guide the first lug to an engagement position at which the first lug engages with the second lug.

2. The oscillatory linear actuator according to claim 1, wherein the coil bobbin has a limiting protrusion that fits between the core and the base and limits movement of the core to prevent the first lug from moving from the engagement position.

3. A hair cutting device comprising:
   the oscillatory linear actuator according to claim 1; and
   a movable blade connected to the oscillatory linear actuator.

4. A method of manufacturing the oscillatory linear actuator according to claim 1, the method comprising:
   assembling the electromagnetic core block by mounting the core and the coil bobbin on the base;
   adjusting the positional relation of the permanent magnet and the electromagnet by guiding the electromagnetic core block by the guide portion of the frame; and
   fixing the base to the frame inside the guide portion.

5. An oscillatory linear actuator comprising:
   an electromagnetic core block including an electromagnet; and
   a magnetic block that holds a permanent magnet so that the permanent magnet faces the electromagnet with a predetermined space in between,
   wherein the electromagnetic core block integrally includes:
      a core and a coil bobbin that form the electromagnet; and
      a base that holds the core and the coil bobbin,
   wherein the magnetic block includes:
      the permanent magnet; and
      a frame that holds the permanent magnet to allow the permanent magnet to oscillate freely and holds the electromagnetic core block,
   wherein the frame has a guide portion that guides the electromagnetic core block to adjust a positional relation of the permanent magnet and the electromagnet, and
   wherein the base is fixed to the frame inside the guide portion,
   wherein the core has a first lug that protrudes in a direction intersecting with a guide direction in which the guide portion guides the electromagnetic core block, wherein the base has:
- a second lug that protrudes in the direction intersecting with the guide direction to be engaged with the first lug and limit movement of the core in the guide direction; and
- an engaging path that guides the first lug to an engagement position at which the first lug engages with the second lug, and wherein the coil bobbin has a limiting protrusion that fits between the core and the base and limits movement of the core to prevent the first lug from moving from the engagement position.

\* \* \* \* \*